United States Patent
Hong et al.

(10) Patent No.: US 10,392,457 B2
(45) Date of Patent: Aug. 27, 2019

(54) METHOD OF PREPARING THERMOPLASTIC RESIN

(71) Applicant: LG CHEM, LTD., Seoul (KR)

(72) Inventors: Sung Won Hong, Daejeon (KR); Hyung Sub Lee, Daejeon (KR); Min Cheol Ju, Daejeon (KR); Min Seung Shin, Daejeon (KR); In Soo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 207 days.

(21) Appl. No.: 15/528,492

(22) PCT Filed: Sep. 8, 2016

(86) PCT No.: PCT/KR2016/010103
§ 371 (c)(1),
(2) Date: May 19, 2017

(87) PCT Pub. No.: WO2017/043891
PCT Pub. Date: Mar. 16, 2017

(65) Prior Publication Data
US 2019/0085106 A1     Mar. 21, 2019

(30) Foreign Application Priority Data

Sep. 8, 2015   (KR) .................. 10-2015-0127187

(51) Int. Cl.
| | | |
|---|---|---|
| *C08F 212/12* | (2006.01) | |
| *C08L 9/08* | (2006.01) | |
| *C08F 6/22* | (2006.01) | |
| *C08K 3/34* | (2006.01) | |
| *C08L 25/16* | (2006.01) | |
| *C08K 3/10* | (2018.01) | |
| *C08J 3/07* | (2006.01) | |
| *C08K 3/16* | (2006.01) | |
| *C08K 3/30* | (2006.01) | |

(52) U.S. Cl.
CPC .............. *C08F 212/12* (2013.01); *C08F 6/22* (2013.01); *C08J 3/07* (2013.01); *C08K 3/10* (2013.01); *C08K 3/34* (2013.01); *C08L 9/08* (2013.01); *C08L 25/16* (2013.01); *C08F 2800/10* (2013.01); *C08K 2003/162* (2013.01); *C08K 2003/3045* (2013.01); *C08K 2003/343* (2013.01)

(58) Field of Classification Search
CPC ....... C08F 212/12; C08F 2800/10; C08J 3/07; C08L 25/16; C08K 3/34; C08K 2203/343
USPC .......................................................... 524/442
See application file for complete search history.

(56) References Cited

U.S. PATENT DOCUMENTS

| | | | | |
|---|---|---|---|---|
| 2,429,439 A | * | 10/1947 | Westfahl ................. | C08J 3/215 524/442 |
| 2012/0322924 A1 | | 12/2012 | Arigo et al. | |

FOREIGN PATENT DOCUMENTS

| | | | | |
|---|---|---|---|---|
| CN | 107001747 A | 8/2017 | | |
| EP | 3208306 A1 | 8/2017 | | |
| JP | S57-63313 A | 4/1982 | | |
| JP | H01-234466 A | 9/1989 | | |
| KR | 10-2009-0038510 A | 4/2009 | | |
| KR | 10-2010-0034340 A | 4/2010 | | |
| KR | 1020100034340 A | * 4/2010 | ............... | C08F 6/14 |
| KR | 10-2011-0068197 A | 6/2011 | | |
| KR | 10-2015-0037460 A | 4/2015 | | |

OTHER PUBLICATIONS

Office Action from Chinese Patent Office for Application No. 201680003934.8 dated Sep. 3, 2018.
Extended European search report for EP Application No. 16844707.6, dated Jun. 5, 2018.
International Search Report for International Patent Application No. PCT/KR2016/010103 filed on Sep. 8, 2016.

* cited by examiner

Primary Examiner — Michael Bernshteyn

(57) ABSTRACT

The present invention relates to a method of preparing a thermoplastic resin. More particularly, the present invention relates to a method of preparing a thermoplastic resin, the method including a coagulation step of adding a water-soluble silicate compound and a metal salt coagulant to an α-methylstyrene-vinyl cyan compound copolymer latex, followed by coagulation. In accordance with the present invention, a method of preparing a thermoplastic resin having superior heat resistance by adding an additive during coagulation and aging of α-methylstyrene-vinyl cyan compound copolymer latex while controlling an addition time point of the additive is provided.

16 Claims, 1 Drawing Sheet

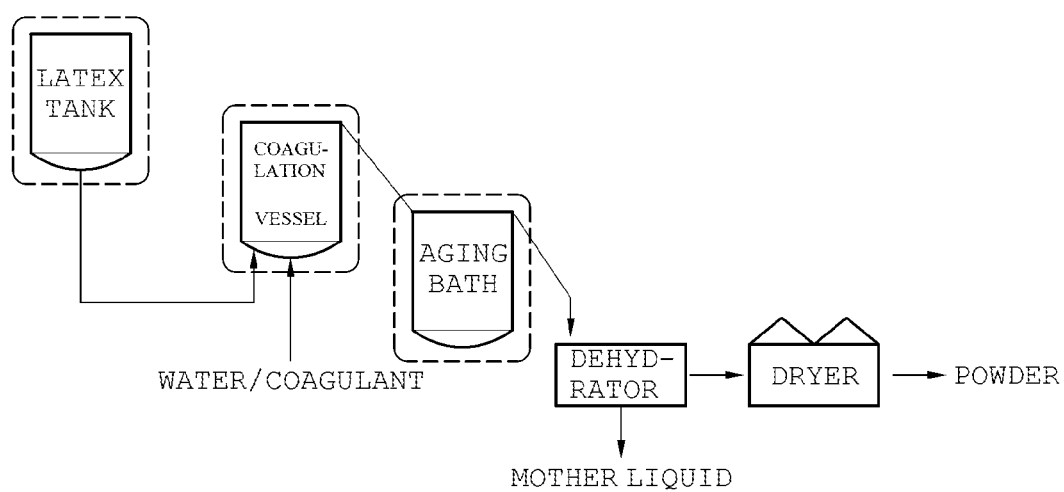

METHOD OF PREPARING THERMOPLASTIC RESIN

TECHNICAL FIELD

The present invention relates to a method of preparing a thermoplastic resin, more particularly to a method of preparing a thermoplastic resin having superior heat resistance by adding an additive during coagulation and aging of α-methylstyrene-vinyl cyan compound copolymer latex while controlling an addition time point of the additive.

BACKGROUND ART

Cross-Reference to Related Application(s)

This application is a U.S. National Stage of International Patent Application No. PCT/KR2016/010103, filed on Sep. 8, 2016, which claims the priority benefit of Korean Patent Application No. 10-2015-0127187, filed on Sep. 8, 2015 in the Korean Intellectual Property Office, the disclosures of which are incorporated herein by reference in their entireties.

In general, acrylonitrile-butadiene-styrene (ABS) copolymer resins have superior processability and excellent appearance characteristics due to inclusion of styrene, rigidity and chemical resistance due to inclusion of acrylonitrile, and impact resistance of butadiene rubber. Accordingly, acrylonitrile-butadiene-styrene (ABS) copolymer resins are used in various fields such as automobile interior materials, housings for household appliances, and toys. In particular, since automobile interior materials are often exposed to high temperatures, superior thermal resistance, e.g., heat deflection temperature (HDT), is required.

To produce acrylonitrile-butadiene-styrene copolymer resin satisfying such high thermal resistance, a method of melt-mixing an α-methylstyrene-acrylonitrile copolymer (AMSAN), which is prepared through emulsion polymerization or solution polymerization and has a high glass transition temperature (Tg), with a rubber-reinforced graft copolymer (ABS copolymer), which is prepared through emulsion polymerization, while controlling the content of rubber within a predetermined range has been suggested.

Such an α-methylstyrene-acrylonitrile copolymer is generally prepared by copolymerizing an α-methylstyrene monomer with a vinyl cyanide compound monomer through emulsion polymerization. However, the α-methylstyrene monomer has drawbacks such as low reactivity and polymerization stability. When the content of α-methylstyrene is increased to overcome such disadvantages, a polymerization conversion rate is decreased, and thus, productively is decreased. In addition, problems such as depolymerization and oligomer generation may occur depending upon a temperature condition during polymerization, whereby heat resistance may be decreased.

RELATED ART DOCUMENT

Patent Document (Patent Document 1) US2012-0322924 A1

DISCLOSURE

Technical Problem

Therefore, the present invention has been made in view of the above problems, and it is one object of the present invention to provide a method of preparing a thermoplastic resin having superior heat resistance by adding an additive during coagulation and aging of α-methylstyrene-vinyl cyan compound copolymer latex while controlling an addition time point of the additive.

The above object and other objects of the present invention can be achieved by the following description.

Technical Solution

In accordance with an aspect of the present invention, the above and other objects can be accomplished by the provision of a method of preparing a thermoplastic resin, the method including a coagulation step of adding a water-soluble silicate compound and a metal salt coagulant to an α-methylstyrene-vinyl cyan compound copolymer latex, followed by coagulation.

Advantageous Effects

As apparent from the above description, the present invention provides a method of preparing a thermoplastic resin having superior heat resistance by adding an additive during coagulation and aging of α-methylstyrene-vinyl cyan compound copolymer latex while controlling an addition time point of the additive.

DESCRIPTION OF DRAWINGS

FIG. 1 schematically illustrates a process of obtaining a prepared α-methylstyrene-vinyl cyan compound copolymer latex in a powder form through coagulation, aging, dehydration, and drying steps.

BEST MODE

Hereinafter, the present invention is described in detail.

The present inventors confirmed that, by adding a water-soluble silicate compound when an α-methylstyrene-vinyl cyan compound copolymer latex is coagulated or aged using a metal salt coagulant, heat resistance increases, and such heat resistance may be further increased depending upon an addition time point of the water-soluble silicate compound, thus completing the present invention.

Hereinafter, a method of preparing a thermoplastic resin of the present invention is described in detail.

The method of preparing a thermoplastic resin includes a coagulation step of adding a water-soluble silicate compound and a metal salt coagulant to an α-methylstyrene-vinyl cyan compound copolymer latex, followed by coagulation.

The water-soluble silicate compound has a solubility in water of 22.2 g/100 ml or more at room temperature (20 to 26° C.).

The coagulation step may be carried out, for example, at 70 to 100° C., 75 to 95° C., or 80 to 90° C. Preferably, the coagulation step is carried out at greater than 80° C., 85 to 120° C., 90 to 110° C., 90 to 105° C., or 95 to 100° C. Within these temperature ranges, pyrolysis of a resin latex may be prevented and the prepared resin may exhibit superior heat resistance.

The method of preparing a thermoplastic resin may include, for example, an aging step after the coagulation step.

The aging step is preferably an aging step at high temperature under pressure. In this case, a thermoplastic resin exhibits superior heat resistance, whiteness degree, and thermal conductivity shielding property due to re-assembly among particles of ingredients and particle size increase.

The aging step may be carried out, for example, at 110° C. or more, 110 to 130° C., 115 to 130° C., or 120 to 130° C. Within this temperature range, a slurry particle size increases and a moisture content in a powder is decreased, whereby dehydration may be easily carried out during a dehydration process.

The powder refers to copolymer particles in an coagulated state and has a wet powder form.

The aging step may be carried out, for example, under a pressure of 0.15 MPa or more, 0.15 to 0.3 MPa, 0.15 to 0.25 MPa, or 0.22 to 0.25 MPa. Within this pressure range, a moisture content in a powder may be decreased.

The aging step may be carried out, for example, for 5 minutes or more, 10 minutes or more, or 10 minutes to 30 minutes. Within this range, a thermoplastic resin exhibits superior heat resistance, whiteness degree, and thermal conductivity shielding property due to re-assembly among particles of ingredients and particle size increase.

The method of preparing a thermoplastic resin may include, for example, a stirring step after addition of the water-soluble silicate compound.

The water-soluble silicate compound may react with, for example, the metal salt coagulant to form a compound represented by Formula 1 below. In this case, the formed insoluble silicate metal salt is dispersed in the resin and thus heat conduction is shielded, whereby heat resistance increases. In particular, when the water-soluble silicate compound is added after the latex is coagulated using the metal salt coagulant and before a coagulated latex is aged, the amount of reacted substances is large and thus heat resistance further increases, compared to the case of being added after coagulation and aging. In addition, when the water-soluble silicate compound is added before addition of the metal salt coagulant, the amount of reacted substances is highest, and thus, heat resistance increases, compared to the case of being added before aging after coagulation or after aging.

$$A_o(Si_nO_{2n+1})_p \quad \text{[Formula 1]}$$

wherein A is a divalent or trivalent metal, n is an integer of 1 to 100, and each of o and p is an integer of 1 to 5.

n may be, for example, an integer of 1 to 50, or an integer of 1 to 20.

o may be, for example, 1 or 2, and p may be, for example, 1 or 3.

The compound represented by Formula 1 may have a solubility in water of, for example, 0.001 to 0.1%, 0.005 to 0.05%, or 0.005 to 0.02%. Within this range, superior heat resistance is exhibited.

The water refers to common water having a density of 1 g/ml at 4° C., and the solubility refers to percentage by weight (g) of an insoluble silicate metal salt that is dissolved in 100 ml of water at room temperature (20 to 26° C.).

Reaction between the water-soluble silicate compound and the metal salt coagulant refers to a reaction represented by Reaction Formula 1 below:

$$xM_2(Si_nO_{2n+1})(aq)+yA_mX_s(aq) \rightarrow A_o(Si_nO_{2n+1})_p(s)+ zM_qX_r(aq) \quad \text{[Reaction Formula 1]}$$

wherein M is an alkali metal, n is an integer of 1 to 100, A is a divalent or trivalent metal, X is a halogen element or a sulfate ion, and each of m, o, p, q, r, s, x, y, and z is an integer of 1 to 5.

n may be, for example, an integer of 1 to 50, or an integer of 1 to 20.

m may be, for example, 1 or 2, and s may be, for example, an integer of 1 to 3.

x may be, for example, 1 or 2, y may be, for example, 1 or 3, and z may be, for example, an integer of 1 to 3.

Each of o, q, and r may be, for example, 1 or 2, and p may be, for example, 1 or 3.

The reaction temperature may be, for example, greater than 80° C., 85 to 120° C., 90 to 110° C., 90 to 105° C., or 95 to 100° C. Within this range, substitution reaction uniformly and stably occurs.

The reaction pressure may be, for example, 0.9 to 1.1 bar or atmospheric pressure. Within this range, substitution reaction uniformly and stably occurs.

The reaction time may be, for example, 5 minutes or more, 10 minutes or more, 5 minutes to 1 hour, or 10 minutes to 30 minutes. Within this range, substitution reaction uniformly and stably occurs.

Preferably, in the reaction, the metal salt coagulant, for example, is added simultaneously with the water-soluble silicate compound, or is added after addition of the water-soluble silicate compound. In this case, since substitution reaction uniformly and stably occurs in a polymer latex, heat resistance, whiteness degree, and thermal conductivity shielding property are greatly increased.

The compound represented by Formula 1 may be, for example, $ASiO_3$, and the $ASiO_3$ may be converted into $A_3SiO_5$ in the presence of water ($H_2O$). Finally, A-S—H (AO—$SiO_2$—$H_2O$) may present in a resin as represented by Reaction Formula 2 below. In this case, superior heat resistance is exhibited:

$$2A_3SiO_5+7H_2O \rightarrow 3AO.2SiO_2.4H_2O+3A(OH)_2 \quad \text{[Reaction Formula 2]}$$

wherein A is a divalent metal.

The α-methylstyrene-vinyl cyan compound copolymer may be prepared by, for example, copolymerizing α-methylstyrene, an aromatic vinyl compound (except for α-methyl styrene), and a vinyl cyan compound.

The α-methylstyrene may be included in an amount of, for example, 45 to 80% by weight, 50 to 80% by weight, or 60 to 80% by weight with respect to the α-methylstyrene-vinyl cyan compound copolymer. Within this range, superior heat resistance is exhibited.

The aromatic vinyl compound may be, for example, one or more selected from the group consisting of styrene, p-methylstyrene, o-ethylstyrene, p-ethylstyrene, vinyl toluene, and derivatives thereof.

The aromatic vinyl compound may be included in an amount of, for example, 1 to 15% by weight, or 2 to 10% by weight with respect to the α-methylstyrene-vinyl cyan compound copolymer. Within this range, superior mechanical properties and property balance are exhibited.

The vinyl cyan compound may be, for example, one or more selected from the group consisting of acrylonitrile, methacrylonitrile, ethacrylonitrile, and derivatives thereof.

The vinyl cyan compound may be included in an amount of, for example, 15 to 50% by weight, 15 to 45% by weight, or 15 to 35% by weight. Within this range, superior mechanical properties are exhibited.

The α-methylstyrene-vinyl cyan compound copolymer may be copolymerized, for example, through emulsion polymerization.

The emulsion polymerization may be, for example, a batch process, a semi-batch process, or a continuous process.

In the emulsion polymerization, for example, an emulsifier, an electrolyte, a polymerization initiator, a reactive initiator, and a molecular weight regulator may be further included.

In another embodiment, the α-methylstyrene-vinyl cyan compound copolymer may be prepared by first-polymerizing α-methylstyrene, aromatic vinyl compound (except for α-methyl styrene), and vinyl cyan compound until a polymerization conversion rate reaches 30 to 50%, or 35 to 45%, followed by additionally adding a vinyl cyan compound thereto and performing second polymerization until a polymerization conversion rate reaches 80 to 99%, or 85 to 95%.

With regard to addition of the vinyl cyan compound, for example, 40 to 80% by weight, or 50 to 70% by weight of the vinyl cyan compound may be added compound during the first polymerization and the remainder of the vinyl cyan compound, i.e., 20 to 60% by weight of the vinyl cyan compound or 30 to 50% by weight of the vinyl cyan compound, may be added during the second polymerization, based on a total addition amount of the vinyl cyan.

During the second polymerization, for example, an emulsifier and a reactive initiator, along with the vinyl cyan compound, may be further added.

A condition of the polymerization and addition amounts of polymerization water, an emulsifier, and the like may be suitably adjusted within general ranges. In addition, other reaction methods may be selected as needed without specific limitation so long as the reaction methods are methods generally used in the art.

In the present disclosure, a polymerization conversion rate may be calculated by drying 1.5 g of a polymer latex in 150° C. hot-air dryer for 15 minutes and measuring the weight of the dried polymer latex to determine total solids content (TSC). A polymerization conversion rate may be calculated according to Mathematical Equation 1 below:

$$\text{Polymerization conversion rate (\%)} = \frac{\text{(Parts by weight of added monomers and sub-materials)} - \text{(Parts by weight of added sub-materials except for monomers)}}{\text{Total solid content (TSC)}} \times 100 \quad \text{[Mathematical Equation 1]}$$

The water-soluble silicate compound refers to a silicate compound that may be dissolved in water and may be present in aqueous solution state.

The water-soluble silicate compound refers to a compound having a solubility in water of 10 to 90%, 10 to 70%, or 10 to 50%.

The water is general water having a density of 1 g/ml at 4° C., and the solubility refers to percentage by weight (g) of a water-soluble silicate compound dissolved in 100 ml of water at room temperature (20 to 26° C.).

The water-soluble silicate compound may be, for example, a linear silicate compound represented by Formula 2 below:

$$M_2(SiO_nO_{2n+1}) \quad \text{[Formula 2]}$$

wherein M is an alkali metal and n is an integer of 1 to 100.

N may be, for example, an integer of 1 to 50, or an integer of 1 to 20.

The water-soluble silicate compound may be, for example, sodium silicate ($Na_2SiO_3$) or potassium silicate ($K_2SiO_3$).

The water-soluble silicate compound may be included in an amount of, for example, 0.01 to 20 parts by weight, 0.1 to 5 parts by weight, 0.2 to 2 parts by weight, 0.3 to 1 part by weight, or 0.4 to 0.8 parts by weight based on 100 parts by weight of the α-methylstyrene-vinyl cyan compound copolymer. Within this range, superior heat resistance and mechanical properties are exhibited.

The water-soluble silicate compound may be added, for example, before, after, or upon addition of the metal salt coagulant. Preferably, the water-soluble silicate compound is added before or upon addition of the metal salt coagulant. In this case, superior heat resistance is exhibited.

In another embodiment, the water-soluble silicate compound may be added before addition of the metal salt coagulant, after the coagulation and before the aging, or after the aging. Preferably, the water-soluble silicate compound is added before addition of the metal salt coagulant. In this case, superior heat resistance is exhibited.

The water-soluble silicate compound may be added in an amount of, for example, 0.5 to 20% by weight of an aqueous solution, 0.5 to 15% by weight of an aqueous solution, 1 to 15% by weight of an aqueous solution, 1 to 10% by weight of an aqueous solution, 1 to 5% by weight of an aqueous solution, or 1 to 2% by weight of an aqueous solution. In this case, the water-soluble silicate compound is uniformly dispersed in the copolymer latex, and the concentration of latex and total solids content (TSC) are not greatly changed. Accordingly, there is no risk of increase in water content and substitution reaction is uniformly, stably performed, whereby heat resistance, whiteness degree, and thermal conductivity shielding property are greatly improved.

Referring to FIG. 1 as a particular embodiment, the water-soluble silicate compound may be fed into a latex tank, a coagulation vessel, and an aging bath. When the water-soluble silicate compound is fed into the latex tank, stirring is performed to prevent solidification due to the water-soluble silicate compound, followed by supplying the stirred water-soluble silicate compound to the coagulation vessel. When the water-soluble silicate compound is fed into the coagulation vessel, the water-soluble silicate compound may be added to a coagulated latex slurry after coagulation of the latex with a coagulant. When the water-soluble silicate compound is fed into the aging bath, the water-soluble silicate compound may be added to an aged latex aging slurry after aging of the coagulated latex agglomerate slurry.

The metal salt coagulant may be, for example, a metal salt coagulant represented by Formula 3 below:

$$A_mX_s \quad \text{[Formula 3]}$$

wherein A is a divalent or trivalent metal, X is a halogen element or a sulfate ion, m is an integer of 1 to 5, and s is an integer of 1 to 5.

m may be, for example, 1 or 2, and s may be, for example, an integer of 1 to 3.

The metal salt coagulant may be, for example, one or more selected from the group consisting of calcium chloride, magnesium sulfate, and aluminum sulfate.

The metal salt coagulant may be included in an amount of, for example, 0.01 to 20 parts by weight, 2 to 5 parts by weight, or 3 to 4 parts by weight based on 100 parts by weight of the α-methylstyrene-vinyl cyan compound copolymer. Within this range, the prepared resin exhibits superior heat resistance.

In a thermoplastic resin prepared according to the method of preparing a thermoplastic resin, a residual metal amount in a metal salt coagulant may be, for example, 1,420 ppm or more, 1,490 to 3,000 ppm, or 1,490 to 2,500 ppm. Within this range, the formed insoluble silicate metal salt is dispersed in the thermoplastic resin and thus an effect of shielding heat conduction is exhibited, whereby heat resistance increases.

In the thermoplastic resin prepared according to the method of preparing a thermoplastic resin, for example, a residual silicon amount in a water-soluble silicate compound may be 10 ppm or more, 10 to 1,000 ppm, or 10 to 500 ppm. Within this range, the formed insoluble silicate metal salt is dispersed in the thermoplastic resin and thus an effect of shielding heat conduction, whereby heat resistance increases.

In the present disclosure, a method of measuring the residual metal amount or the residual silicon amount is not specifically limited so long as the method is a method of measuring a residual element amount which is generally used in this technical field. Particular examples of the method include elemental analysis, chromatography, spectroscopy, and the like.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

140 parts by weight of ion exchange water, 70 parts by weight of α-methylstyrene as a monomer, 5 parts by weight of styrene, 1.0 part by weight of alkenyl alkanoic potassium salt as a reactive emulsifier, 0.5 parts by weight of oleic acid potassium salt, 15 parts by weight of acrylonitrile, 0.1 parts by weight of sodium phosphate ($Na_3PO_4$) as an electrolyte, 0.3 parts by weight of tert-dodecylmercaptan (TDDM) as a molecular weight regulator, 0.05 parts by weight of tert-butyl hydroperoxide and 0.025 parts by weight of dextrose as fat-soluble polymerization initiators, 0.05 parts by weight of sodium pyrophosphate, and 0.0005 parts by weight of ferrous sulfate were fed batchwise into a polymerization reactor filled with nitrogen, and first polymerization was performed at a reaction temperature of 50° C. until a polymerization conversion rate reached 40%. Subsequently, 25 parts by weight of ion exchange water, 10 parts by weight of acrylonitrile, 0.2 parts by weight of oleic acid potassium salt, and 0.12 parts by weight of potassium persulfate, as a reactive initiator (ini-surfactant), for increasing stability at middle and late stages of reaction and increasing a conversion rate were fed in an emulsified state into the polymerization reactor and second polymerization was performed. Temperature was elevated up to 80° C., and then reaction was terminated when a polymerization conversion rate reached to 90%. As a result, an AMSAN copolymer latex was prepared.

0.5 parts by weight of sodium silicate ($Na_2SiO_3$) (based on solid content, 1% by weight aqueous solution) was added to 100 parts by weight of the prepared emulsion polymerization copolymer latex (based on solid content) and stirring was performed. 3 parts by weight of calcium chloride as a metal salt coagulant was added to the stirred mixture, and coagulation was performed at 90 to 95° C. for 10 minutes under atmospheric pressure (normal pressure).

The coagulated emulsion polymerization copolymer latex slurry was pressurized at 0.15 to 0.25 MPa and aged at 110 to 130° C. for 10 minutes.

Subsequently, the aged emulsion polymerization copolymer latex slurry was dehydrated and dried at 98° C. for 300 seconds. As a result, an AMSAN copolymer resin powder was obtained.

77 parts by weight of the obtained AMSAN copolymer resin powder was mixed with 23 parts by weight of a conventional acrylonitrile-butadiene-styrene (ABS) resin powder (product name: DP271, manufactured by LG Chemistry) in a general mixer. A resultant mixture was melted and kneaded at 240° C. by means of a twin-screw extruder, thereby preparing a pellet-type resin composition. The prepared pellet-type resin composition was injection-molded by means of an injection molding machine and prepared into a specimen for measuring properties.

Example 2

An experiment was carried out in the same manner as in Example 1, except that sodium silicate ($Na_2SiO_3$) was an emulsion polymerization copolymer latex slurry coagulated with a metal salt coagulant, instead of an emulsion polymerization copolymer latex, and stirring was performed.

Example 3

An experiment was carried out in the same manner as in Example 1, except that sodium silicate ($Na_2SiO_3$) was added to aged emulsion polymerization copolymer latex slurry, instead of an emulsion polymerization copolymer latex, and stirring was performed.

Comparative Example 1

An experiment was carried out in the same manner as in Example 1, except that sodium silicate ($Na_2SiO_3$) was not added.

Comparative Example 2

An experiment was carried out in the same manner as in Comparative Example 1, except that, after agglomerating a latex, the latex was directly dehydrated and dried without being aging.

Comparative Example 3

An experiment was carried out in the same manner as in Example 1, except that 0.5 parts by weight of calcium silicate ($CaSiO_3$) were added instead of 0.5 parts by weight of sodium silicate ($Na_2SiO_3$).

Comparative Example 4

A latex copolymer slurry was prepared by performing emulsion polymerization, coagulation, and aging processes in the same manner as in Example 1, except that the coagulation was performed at 70 to 80° C. and the aging process was performed at 80 to 90° C. However, a copolymer latex slurry obtained after aging had a high moisture content rate of about 73% by weight, and thus, particle size distribution was not uniform and the content of fine particles content was high even after subsequent dehydration and drying processes. Accordingly, a solid having very small average particle diameter was obtained, whereby it was difficult to mix and extrude with an additive. As a result, a final specimen was not obtained.

Test Examples

The properties of the thermoplastic resin composition specimens obtained according to Examples 1 to 3 and Comparative Examples 1 to 3 were measured according to the following methods. Results are summarized in Table 1 below.

Measurement Methods

*Glass transition temperature (Tg, ° C.): The glass transition temperature of each of AMSAN copolymer resins was measured five times using a differential scanning calorimeter (DSC, manufactured by company TA), and an average value thereof (error range: ±0.5° C.) was calculated.

*X-ray fluorescence analysis (XRF, ppm): A residual metal amount of a metal salt coagulant in a prepared resin and a residual silicon amount in a water-soluble silicate compound were measured using a SPECTRO XEPOS (X-ray), manufactured by company SPECTRO.

*Average particle diameter: The particle size of a recovered resin powder was measured by means of a HAVER EML 200 digital plus-test sieve shaker, through a vibration process using meshes (seven kinds). In this case, particles having a weight average particle diameter of 1,400 μm or more were classified into coarse particles, and particles having a weight average particle diameter of 75 μm or less were classified into fine particles.

On the other hand, it can be confirmed that, in the case of Comparative Example 1 in which a water-soluble silicate compound was not added, a glass transition temperature is remarkably low, compared to the examples, and, in the case of Comparative Example 2 in which an aging step was not performed, glass transition temperature is relatively high, but a particle size of the prepared AMSAN copolymer is too fine to apply to molded articles.

In addition, it can be confirmed that, in the case of Comparative Example 3 in which calcium silicate was directly added, dispersibility is low and thus heat resistance is different according to a collected powder. Accordingly, it was impossible to measure glass transition temperature thereof.

In conclusion, a method of preparing a thermoplastic resin of the present invention uses the characteristic that the heat resistance of a resin is increased by adding a water-soluble silicate compound when an α-methylstyrene-vinyl cyan compound copolymer latex is coagulated or aged with a metal salt coagulant. Accordingly, it was confirmed that a thermoplastic resin having superior heat resistance may be realized.

The invention claimed is:

1. A method of preparing a styrene acrylonitrile (SAN) resin, the method comprising:
    a coagulation step of adding a water-soluble silicate compound and a metal salt coagulant to an α-methylstyrene-vinyl cyan compound copolymer latex, followed by coagulation;
    an aging step after the coagulation step; and
    drying the coagulated copolymer latex to form a powder of particles having an average diameter of 500 to 700 microns,
    wherein the coagulation step is carried out at a temperature of greater than 80° C., and the aging step is carried out at 110° C. or more.

TABLE 1

| | Classification | | | | | |
| --- | --- | --- | --- | --- | --- | --- |
| | Examples | | | Comparative Examples | | |
| | 1 | 2 | 3 | 1 | 2 | 3 |
| Tg (° C.) | 132.42 | 130.95 | 128.89 | 128.11 | 132.80 | — |
| XRF (ppm) Ca | 2,123 | 2,034 | 1,515 | 1,407 | 1,482 | 2,485 |
| Si | 85 | 170 | 106 | — | — | 161 |
| Average particle diameter | 500 to 700 | 500 to 700 | 500 to 700 | 500 to 700 | 200 to 350 | 500 to 700 |

As summarized in Table 1, it can be confirmed that the AMSAN copolymer resins of Examples 1 to 3 prepared according to the present invention exhibit superior glass transition temperature (Tg).

In addition, it can be confirmed that a formation amount of the insoluble silicate metal salt depends upon a remaining amount of calcium (Ca) and an addition time point of the water-soluble silicate compound, and glass transition temperature further increases with increasing formation amount of the insoluble silicate metal salt.

In addition, it can be confirmed that glass transition temperature is greatly affected, compared to the comparative examples to which a water-soluble silicate compound was not added, due to a remaining small amount of silicone (Si).

2. The method according to claim 1, wherein the water-soluble silicate compound is added before, after, or upon addition of the metal salt coagulant.

3. The method according to claim 1, wherein the aging step is carried out at a pressure of 0.05 MPa or more.

4. The method according to claim 1, comprising a stirring step after addition of the water-soluble silicate compound.

5. The method according to claim 1, wherein the water-soluble silicate compound reacts with the metal salt coagulant to form a compound represented by Formula 1 below:

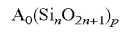
[Formula 1]

wherein A is a divalent or trivalent metal, n is an integer of 1 to 100, and each of o and p is an integer of 1 to 5.

6. The method according to claim 5, wherein the compound represented by Formula 1 has a solubility in water of 0.001 to 0.1%.

7. The method according to claim 1, wherein the vinyl cyan compound is one or more selected from the group consisting of acrylonitrile, methacrylonitrile, and ethacrylonitrile.

8. The method according to claim 1, wherein α-methylstyrene is comprised in an amount of 45 to 80% by weight, and the vinyl cyan compound is comprised in an amount of 15 to 50% by weight.

9. The method according to claim 1, wherein the α-methylstyrene-vinyl cyan compound further comprises 1 to 15% by weight of an aromatic vinyl compound (except for α-methylstyrene).

10. The method according to claim 1, wherein the water-soluble silicate compound is a linear silicate compound represented by Formula 2 below:

$$M_2(Si_nO_{2n+1}) \quad \text{[Formula 2]}$$

wherein M is an alkali metal and n is an integer of 1 to 100.

11. The method according to claim 1, wherein the water-soluble silicate compound is sodium silicate ($Na_2SiO_3$) or potassium silicate ($K_2SiO_3$).

12. The method according to claim 1, wherein the water-soluble silicate compound is comprised in an amount of 0.01 to 20 parts by weight based on 100 parts by weight of the α-methylstyrene-vinyl cyan compound copolymer.

13. The method according to claim 1, wherein the metal salt coagulant is a metal salt coagulant represented by Formula 3 below:

$$A_mX_s \quad \text{[Formula 3]}$$

wherein A is a divalent or trivalent metal, X is a halogen element or a sulfate ion, m is an integer of 1 to 5, and s is an integer of 1 to 5.

14. The method according to claim 1, wherein the metal salt coagulant is one or more selected from the group consisting of calcium chloride, magnesium sulfate, and aluminum sulfate.

15. The method according to claim 1, wherein the metal salt coagulant is comprised in an amount of 0.01 to 20 parts by weight based on 100 parts by weight of the α-methylstyrene-vinyl cyan compound copolymer.

16. The method according to claim 1, wherein the SAN resin has a Tg of from 128.9° C. to 132.4° C.

* * * * *